United States Patent [19]
Champie

[11] Patent Number: 6,096,224
[45] Date of Patent: Aug. 1, 2000

[54] FILTER ALERT

[76] Inventor: Max C. Champie, 413 Laurel St., Bastrop, Tex. 78602

[21] Appl. No.: 09/118,152

[22] Filed: Jul. 17, 1998

[51] Int. Cl.[7] .......................... B01D 37/00; B01D 35/143; H01H 35/40

[52] U.S. Cl. .............................. 210/741; 96/421; 73/753; 210/87; 210/90; 200/81.9 A; 200/81.9 R; 116/268

[58] Field of Search ................................. 210/87, 90, 94, 210/739, 741; 96/421; 116/268; 200/81.9 A, 81.9 R; 73/716, 700, 714, 753, 756, 736

[56] References Cited

U.S. PATENT DOCUMENTS

| | | | |
|---|---|---|---|
| 4,129,856 | 12/1978 | Humphries | 340/554 |
| 4,325,824 | 4/1982 | Mitchell et al. | 210/90 |
| 5,096,574 | 3/1992 | Birdsong et al. | 210/90 |
| 5,124,957 | 6/1992 | Owens, et al. | 368/107 |
| 5,702,592 | 12/1997 | Suri et al. | 210/90 |
| 5,718,822 | 2/1998 | Richter | 210/90 |
| 5,865,991 | 2/1999 | Hsu | 210/90 |
| 5,945,591 | 8/1999 | Saarem | 73/753 |

*Primary Examiner*—Joseph W. Drodge
*Attorney, Agent, or Firm*—Derek R. Van Gilder

[57] ABSTRACT

A filter alert has a pressure differential switch that is responsive to positive and/or negative pressure through a pressure tube. The pressure tube is in fluid communication intermediate a positive-pressure or high-pressure side of an intended filter and a positive-pressure inlet aperture of a pressure-differential switch for indication of positive pressure across the intended filter. Optionally, the pressure tube is in fluid communication intermediate a negative-pressure or low-pressure side of a filter and a low-pressure inlet aperture of the pressure-differential switch for indication of low pressure across the filter. The pressure-differential switch actuates an actuator for alarm signals for desired action. The filter alert also includes a switch condition communication component, a filter condition alert and an alert container on which the pressure-differential switch is positioned.

20 Claims, 2 Drawing Sheets

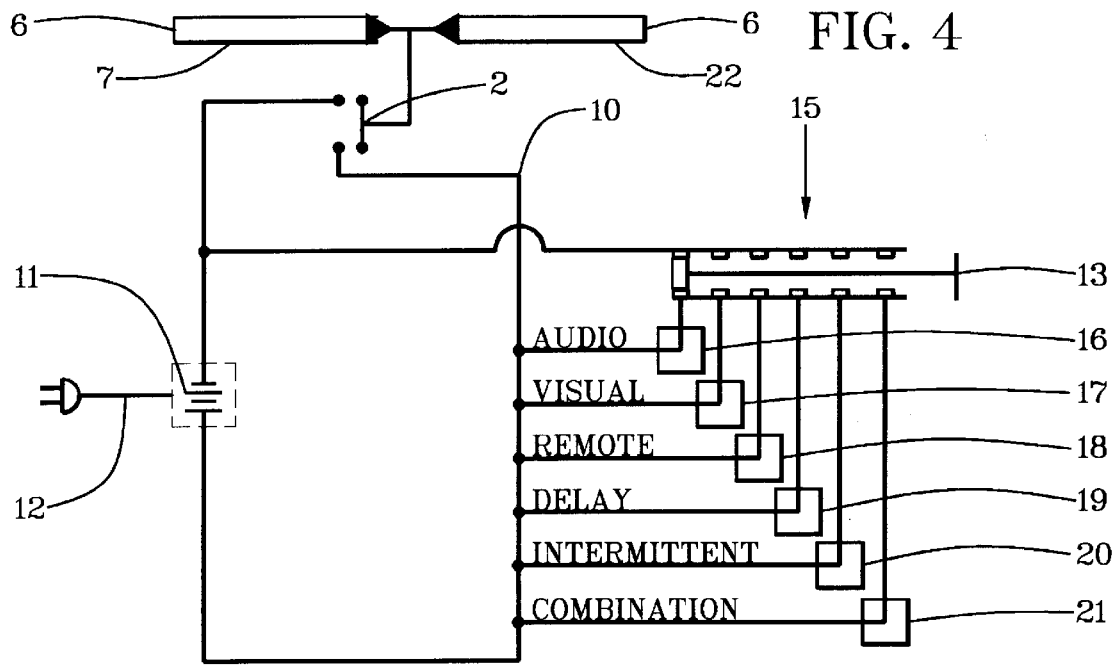
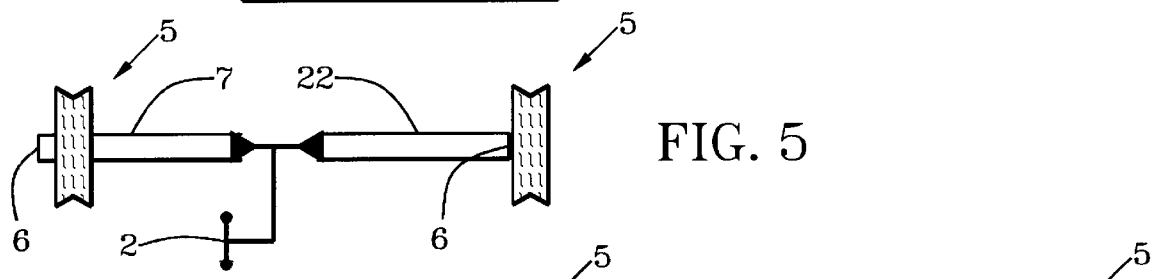
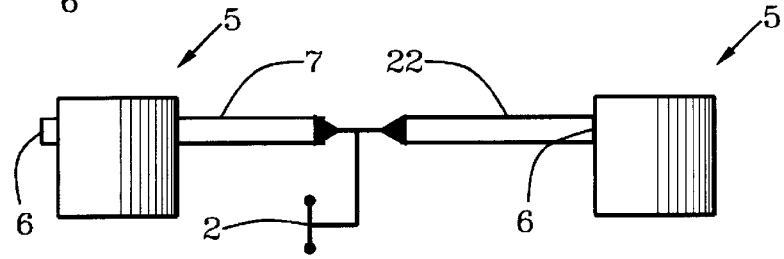
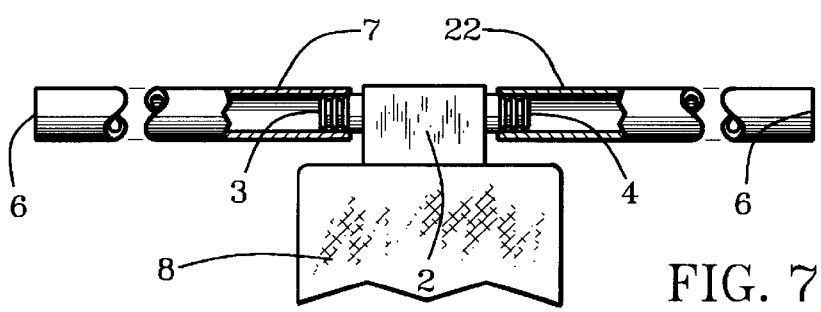

FILTER ALERT

BACKGROUND OF THE INVENTION

1. Field of the Invention

This invention relates to warning and controls in relation to filter conditions.

2. Relation To Prior Art

There are warning and control devices in relation to filter conditions but none known that communicate predetermined response to predetermined levels of either positive or negative pressure with a convenient self-powered unit in a manner taught by this invention.

Examples of different but related filter warning and control systems are described in the following patent documents. U.S. Pat. No. 5,388,189, issued to Kung, described an alarm filter in an expert system for communications network that was not pressure-operated as taught by this invention. U.S. Pat. No. 5,325,809, issued to Mulle, Jr. described a hair-drier alarm that whistled with negative-pressure intake air when the filter was clogged with hair or other material and prevented negative-pressure entry of air into the hair drier except through the negative-pressure whistle. U.S. Pat. No. 5,124,957, issued to Owens et al, described a chronological or time-based filter alarm that was not pressure-operated as taught by this invention. U.S. Pat. No. 4,325,824, issued to Mitchell et al, described a canister type of engine-oil filter having a bypass valve that bypassed the filter and rotated a pointer to a warning position in response to clogging of the oil filter. U.S. Pat. No. 4,129,856, issued to Humphries, described an intrusion alarm operated in response to reflection of radiation on still and relatively moving objects in a radiation field, not filter condition in response to pressure across the filter as taught by this invention.

Problems with monitoring filter conditions continue to exist.

SUMMARY OF THE INVENTION

In light of these problems, objects of patentable novelty and utility taught by this invention are to provide a filter alert which:

Can be actuated by either positive pressure or negative pressure caused by filter conditions of select filtration systems;

Is a self-contained unit that can be after-market or OEM attached to filter systems;

Can be powered by either a self-contained battery or by an outside electrical source; and Has pressure or negative-pressure indication for select manual and automated responses.

This invention accomplishes these and other objectives with a filter alert having a pressure-differential switch that is responsive to positive and/or negative pressure through a pressure tube. The pressure tube is in fluid communication intermediate a positive-pressure or high-pressure side of a filter and a high-pressure side of the pressure-differential switch for indication of positive pressure across the filter. Optionally, the pressure tube is in fluid communication intermediate a negative-pressure or low-pressure side of a filter and a low-pressure side of the pressure-differential switch for indication of low pressure across the filter. The pressure-differential switch actuates an indicator device for indicating desired action.

BRIEF DESCRIPTION OF DRAWINGS

This invention is described by appended claims in relation to description of a preferred embodiment with reference to the following drawings which are described briefly as follows:

FIG. 4 is an electrical schematic diagram of a filter alert having optional positive pressure and negative pressure or low pressure actuation of a pressure-differential switch and a plurality of optional alerts;

FIG. 5 is a sectional view of an actuator of a pressure-differential switch with optional positive-pressure and negative-pressure communication with gaseous10 substance filters;

FIG. 6 is a sectional view of an actuator of a pressure-differential switch with optional positive-pressure and negative-pressure communication with liquid-substance filters; and FIG. 7 is a side view of pressure-switch section of a filter alert having a positive-pressure inlet aperture and a negative-pressure inlet aperture that are both exposed for use.

DESCRIPTION OF PREFERRED EMBODIMENT

Terms used to describe features of this invention are listed below with numbering in the order of their initial use with reference to the drawings. These terms and numbers assigned to them designate the same features wherever used throughout this description.

| | |
|---|---|
| 1. Filter alert | 12. Outside power line |
| 2. Pressure-differential switch | 13. Actuator |
| 3. Positive-pressure inlet aperture | 14. On-off switch |
| 4. Low-pressure inlet aperture | 15. Selector switch |
| 5. Intended filter | 16. Audio alarm |
| 6. Monitored-pressure terminal | 17. Visual alarm |
| 7. Positive-pressure tube | 18. Remote alarm |
| 8. Alert container | 19. Delay alarm |
| 9. Buzzer | 20. Intermittent alarm |
| 10. Electrical circuit | 21. Combination alarm |
| 11. Battery | 22. Negative-pressure tube |

Figure 1:
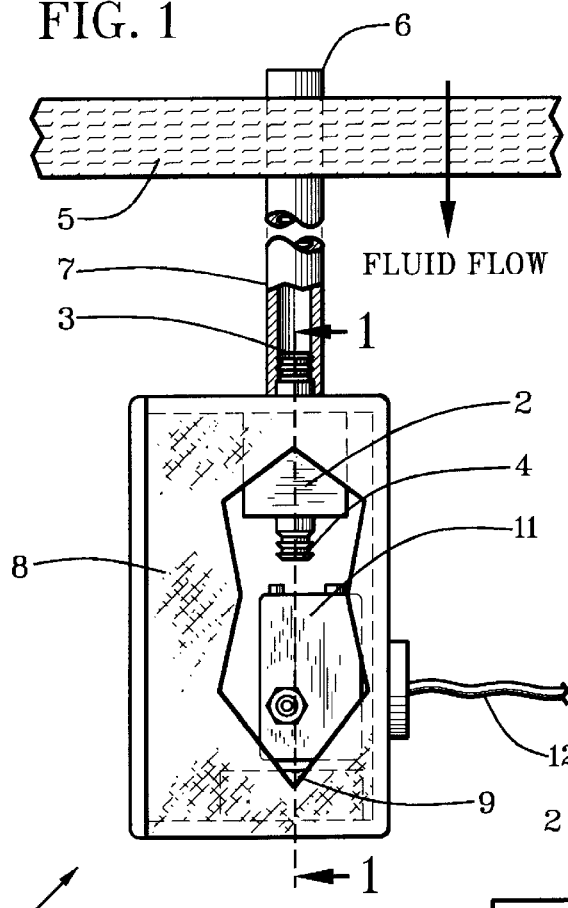
FIG. 1 is a partially cutaway top view of a filter alert having a pressure tube in fluid communication with a positive-pressure side of a filter.
Figure 2:
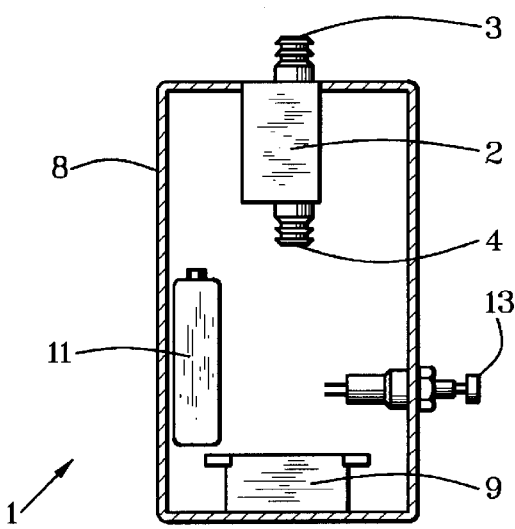
FIG. 2 is a cross sectional view through section line 1—1 of FIG. 1.
Figure 3:
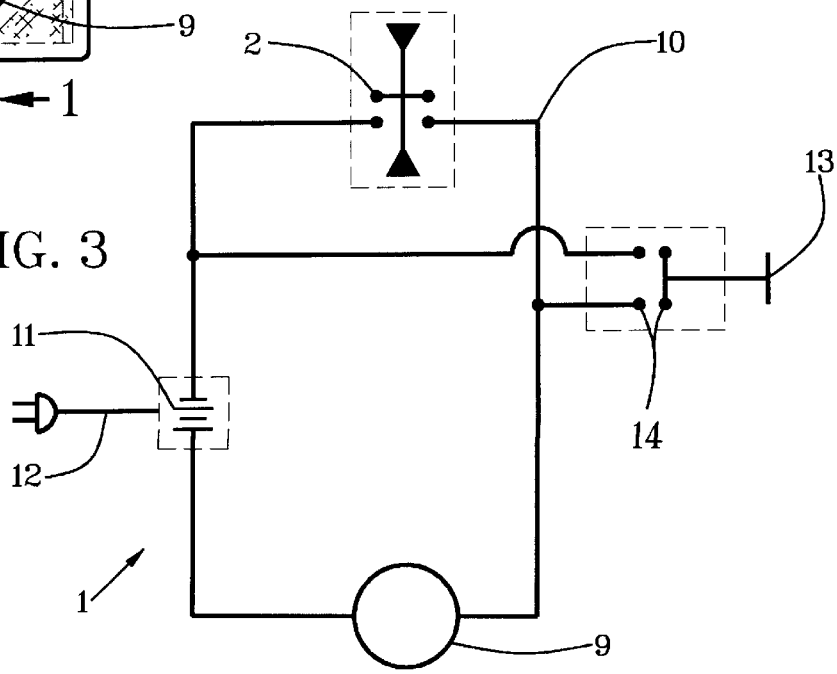
FIG. 3 is an electrical schematic diagram of the FIG. 1 illustration.

Referring first to FIGS. 1–3, a filter alert 1 has a pressure-differential switch 2 with at least one fluid-pressure inlet aperture such as a positive-pressure inlet aperture 3 and a negative-pressure or a low-pressure inlet aperture 4. For a pressure-differential switch 2 that is operated by positive pressure or a relatively high pressure in relationship to an intended filter 5, a monitored-pressure terminal 6 of a positive-pressure tube 7 is positioned in fluid communication between the positive-pressure inlet aperture 3 and a positive-pressure side of the intended filter 5.

The pressure-differential switch 2 is positioned on an alert container 8 which contains a filter-condition alert such as a buzzer 9 which is actuated through a switch-condition communication means such as an electrical circuit 10 that is powered by a current source such as a battery 11 and/or optionally an outside power line 12. An actuator 13 of an on-off switch 14 has switchable electrical communication between an electrical line from a current source and an electrical line to the filter-condition alert such as the buzzer 9.

Referring to FIG. 4, the actuator 13 can be positioned to actuate a selector switch 15 with switchable electrical communication between an electrical line from an electrical power source and selective alarm signaling. The selective alarm signaling can include such signaling as an audio alarm 16, a visual alarm 17, a remote alarm 18, a delay alarm 19, an intermittent alarm 20 and a combination alarm 21.

The pressure-differential switch 2 can be made operative by either positive pressure or negative pressure or by either relatively high pressure and relatively low pressure. The terms "low pressure" and "negative pressure" are used synonymously as are the terms "positive pressure" and "high pressure", owing to relativity of their definitions for use of this filter alert 1. A negative-pressure tube 22 can be provided for fluid communication with either negative pressure or relatively low pressure at the monitored-pressure terminal 6.

Referring to FIGS. 5–6, the intended filter 5, described in relation to FIG. 1, can be either a filter for gaseous substance as depicted by an intended filter 5 that is parallel-sided in FIG. 5 or a filter for liquid substance as depicted by an intended filter 5 that is cylindrical or cannular as depicted in FIG. 6. Intended filters 5 of either a liquid substance or a gaseous substance have a high-pressure side at an entry side or portion and a low-pressure or negative-pressure side at an outlet side or portion. The monitored-pressure terminal 6 of the positive-pressure tube 7 is positioned proximate the high-pressure side and the monitored-pressure terminal 6 of the negative-pressure tube 22 is positioned proximate the negative-pressure side.

Referring to FIG. 7, the pressure-differential switch 2 can have a positive-pressure inlet aperture 3 and a low-pressure inlet aperture 4 that are operative independently or cooperatively through a positive-pressure tube 7 and a negative-pressure tube 22. Either or both can be used.

A new and useful filter alert having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A filter alert comprising:
   a pressure-differential switch having at least one fluid-pressure inlet aperture in fluid communication with a pressure tube having a monitored-pressure terminal in fluid communication with a monitored-pressure portion of an intended filter;
   an alert container on which the pressure-differential switch is positioned;
   a filter-condition alert; and
   a switch-condition communication means intermediate the pressure-differential switch and the filter-condition alert.

2. A filter alert as described in claim 1 wherein:
   the filter-condition alert comprises an audio alarm.

3. A filter alert as described in claim 1 wherein:
   the filter-condition alert comprises a visual alarm.

4. A filter alert as described in claim 3 and further comprising:
   an audible alarm.

5. A filter alert as described in claim 1 wherein:
   the filter-condition alert comprises a remote alarm.

6. A filter alert as described in claim 1 wherein:
   the filter-condition alert is a low-voltage electrical alarm; and
   an electrical storage battery is positioned in electrical communication with the filter-condition alert on the alert container.

7. A filter alert as described in claim 1 wherein:
   the filter-condition alert has an actuator for actuating desired alarm signaling.

8. A filter alert as described in claim 7 wherein:
   the actuator is an on-off switch with switchable electrical communication between an electrical line from an electrical power source and an electrical line to the desired alarm signaling.

9. A filter alert as described in claim 7 wherein:
   the actuator is a selector switch with switchable electrical communication between an electrical line from an electrical power source and an electrical line to the desired alarm signaling.

10. A filter alert as described in claim 1 and further comprising:
    the pressure-differential switch is a low-voltage electrical switch; and
    an electrical storage battery is positioned in communication with the low-voltage electrical switch on the alert container.

11. A filter alert as described in claim 1 wherein:
    the pressure-differential switch is positive-pressure operative;
    the at least one fluid-pressure inlet aperture is a positive-fluid-pressure inlet aperture; and
    the pressure tube is in fluid communication intermediate the positive-fluid-pressure inlet aperture and a positive-pressure portion of the intended filter.

12. A filter alert as described in claim 1 wherein:
    the pressure-differential switch is negative-pressure operative;
    the at least one fluid-pressure inlet aperture is a negative-fluid-pressure inlet aperture; and
    the pressure tube is in fluid communication intermediate the negative-fluid-pressure inlet aperture and a negative-pressure portion of the intended filter.

13. A filter alert as described in claim 1 wherein:
    the pressure-differential switch is selectively positive-pressure or negative-pressure operative;
    the at least one fluid-pressure inlet aperture has a negative-fluid-pressure inlet aperture and a positive-pressure inlet aperture; and
    the pressure tube is selectively in fluid communication with the negative-fluid-pressure inlet aperture and a negative-pressure portion of the intended filter or with the positive-fluid-pressure inlet aperture and a positive-pressure portion of the intended filter.

14. A filter alert as described in claim 1 wherein:
    the switch-condition communication means and the filter-condition alert are electrically operative.

15. A filter alert as described in claim 1 wherein:
    the switch-condition communication means and the filter-condition alert are electrically operative with a battery positioned on the alert container.

16. A filter alert as described in claim 1 wherein:
    the intended filter is a filter of gaseous substance.

17. A filter alert as described in claim 1 wherein:
    the intended filter is a filter of liquid substance.

18. A method for using a filter alert comprising a pressure-differential switch having at least one fluid-pressure inlet aperture in fluid communication with a pressure tube having a monitored-pressure terminal in fluid communication with a monitored-pressure portion of an intended filter; an alert container on which the pressure-differential switch is positioned; a filter-condition alert; and a switch-condition communication means intermediate the pressure-differential switch and the filter-condition alert;

the method having the following steps:

assessing operative condition of the pressure-differential switch by analysis of rate flow of a fluid downstream from the intended filter in proportion to pressure of the fluid upstream from the intended filter; and communicating the operative condition of the pressure-differential switch to the filter-condition alert through the switch-condition communication means.

19. A method as described in claim 18 wherein the pressure-differential switch is selectively positive-pressure and negative-pressure operative; the at least one fluid-pressure inlet aperture has a negative-fluid-pressure inlet aperture and a positive-pressure inlet aperture; the negative-fluid-pressure inlet aperture is in fluid communication with the negative-pressure portion of the intended filter; and the positive-pressure inlet aperture is in fluid communication with the positive-pressure portion of the intended filter;

analyzing the rate of flow of the fluid downstream from the intended filter is accomplished with the pressure-differential switch from the negative-fluid-pressure inlet aperture; and further comprising analyzing the rate of flow of the fluid upstream from the intended filter is accomplished with the pressure-differential switch from the positive-pressure inlet aperture.

20. A method as described in claim 19 and further comprising:

analyzing the rate of flow of the fluid downstream from the intended filter with a separate flow-rate analyzer as a duplicative reliability check.

* * * * *